(12) United States Patent
Vierling

(10) Patent No.: US 9,061,842 B2
(45) Date of Patent: Jun. 23, 2015

(54) METHOD FOR AUTOMATICALLY LOADING A FEED LINE WITH BULK MATERIAL

(75) Inventor: Andreas Vierling, Trebur (DE)

(73) Assignee: WITTMANN KUNSTSTOFFGERAETE GMBH, Vienna (AT)

( * ) Notice: Subject to any disclaimer, the term of this patent is extended or adjusted under 35 U.S.C. 154(b) by 609 days.

(21) Appl. No.: 13/391,173

(22) PCT Filed: Aug. 17, 2010

(86) PCT No.: PCT/AT2010/000301
§ 371 (c)(1),
(2), (4) Date: Feb. 17, 2012

(87) PCT Pub. No.: WO2011/020132
PCT Pub. Date: Feb. 24, 2011

(65) Prior Publication Data
US 2012/0155973 A1 Jun. 21, 2012

(30) Foreign Application Priority Data

Aug. 20, 2009 (AT) .................................. A 1311/2009

(51) Int. Cl.
*B65G 53/00* (2006.01)
*B65G 53/66* (2006.01)
(52) U.S. Cl.
CPC ....................................... *B65G 53/66* (2013.01)
(58) Field of Classification Search
USPC ..................... 406/14, 132, 144, 151, 168, 197
See application file for complete search history.

(56) References Cited

U.S. PATENT DOCUMENTS

| 3,938,848 | A |   | 2/1976  | Krambrock et al. |         |
|-----------|---|---|---------|------------------|---------|
| 4,059,310 | A |   | 11/1977 | Waskiewicz et al.|         |
| 4,221,506 | A | * | 9/1980  | Shapunov et al.  | 406/30  |

(Continued)

FOREIGN PATENT DOCUMENTS

| DE | 1 117 041 B  | 11/1961 |
| DE | 10039564 A1  | 2/2002  |

(Continued)

OTHER PUBLICATIONS

Partial English-language translation of International Report on Patentability (Form 409) dated Aug. 10, 2011 in counterpart PCT Application PCT/AT2010/000301.

(Continued)

*Primary Examiner* — Joseph Dillon, Jr.
(74) *Attorney, Agent, or Firm* — Greenblum & Bernstein, P.L.C.

(57) ABSTRACT

Method for automatically loading feed line with bulk material in suction delivery system having feed line, loading point, reservoir, and at least one material separator arranged at distance to reservoir. Method includes selecting target value for air speed for area of loading point, wherein for area of loading point, minimum target value and maximum target value for air speed are empirically determined from feed line parameters related to feed line and material parameters related to bulk material and values are stored in database. Method includes measuring in area of loading point one of air speed and quantity serving for determination of air speed in feed line and sending target value and measured value of air speed to controller. Method includes controlling air speed to target value via suction capacity, and adding bulk material in metered manner in dependence upon measured value of air speed when target value is reached.

7 Claims, 1 Drawing Sheet

(56) References Cited

U.S. PATENT DOCUMENTS

| | | | | |
|---|---|---|---|---|
| 4,318,643 | A | * | 3/1982 | Larsson et al. ............... 406/14 |
| 4,480,947 | A | * | 11/1984 | Nagasaka ................... 406/14 |
| 4,583,885 | A | * | 4/1986 | Thiele ....................... 406/168 |
| 4,685,476 | A | * | 8/1987 | Hagemann et al. ......... 131/110 |
| 5,006,018 | A | * | 4/1991 | Depew ....................... 406/18 |
| 5,490,745 | A | | 2/1996 | Thiele et al. |
| 5,595,461 | A | * | 1/1997 | Miller ....................... 406/152 |
| 5,752,788 | A | * | 5/1998 | Crum ......................... 406/29 |
| 5,791,829 | A | * | 8/1998 | Iltzsche et al. ............ 406/50 |
| 6,176,647 | B1 | * | 1/2001 | Itoh .......................... 406/31 |
| 6,447,215 | B1 | | 9/2002 | Wellmar |
| 6,588,988 | B2 | | 7/2003 | Zlotos |
| 6,805,175 | B1 | * | 10/2004 | Pinkas et al. ............. 141/130 |
| 6,964,543 | B2 | | 11/2005 | Gerber |
| 8,113,745 | B2 | * | 2/2012 | Aoki ......................... 406/197 |
| 8,360,691 | B2 | * | 1/2013 | Moretto ..................... 406/17 |
| 8,491,228 | B2 | * | 7/2013 | Snowdon ................... 406/169 |
| 2005/0089378 | A1 | | 4/2005 | Gerber |

FOREIGN PATENT DOCUMENTS

| | | |
|---|---|---|
| DE | 10 2006 011 742 B3 | 8/2007 |
| EP | 0 490 174 A1 | 6/1992 |
| FR | 2 235 862 A1 | 1/1975 |
| GB | 999 635 A | 7/1965 |
| JP | 60 118 530 A | 6/1985 |
| WO | WO 99/37565 | 7/1999 |
| WO | WO 02/36469 | 5/2002 |

OTHER PUBLICATIONS

Austrian Office Action dated Nov. 9, 2011 in counterpart Austrian Application No. 1311/2009, along with partial English-language translation.

* cited by examiner

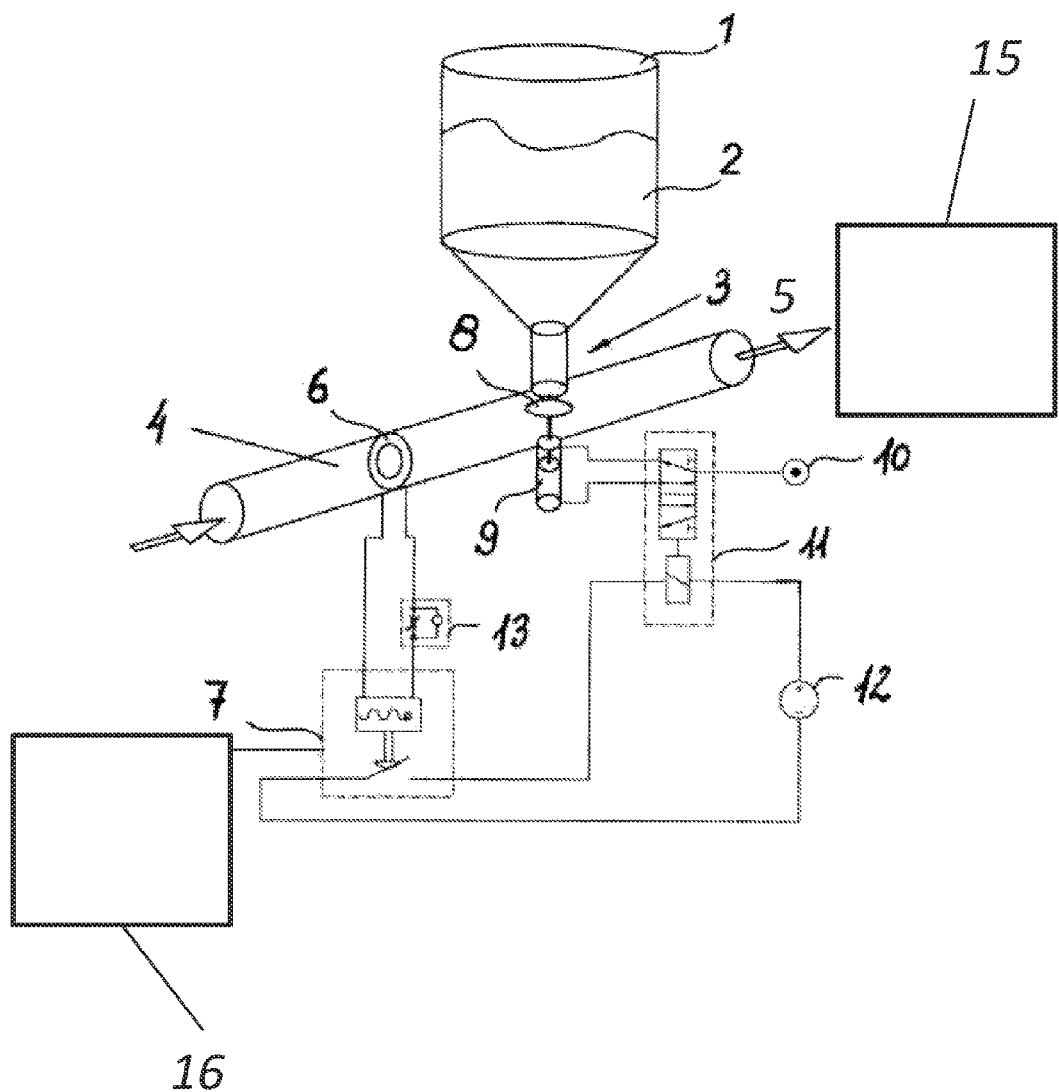

METHOD FOR AUTOMATICALLY LOADING A FEED LINE WITH BULK MATERIAL

CROSS REFERENCE TO RELATED APPLICATIONS

The present application is a U.S. National Stage of International Application No. PCT/AT2010/000301 filed Aug. 17, 2010, which published as WO 2011/020132A1 on Feb. 24, 2011, the disclosure of which is expressly incorporated by reference herein in its entirety. Further, this application claims priority under 35 U.S.C. §119 and §365 of Austrian Application No. A 1311/2009 filed Aug. 20, 2009.

BACKGROUND OF THE INVENTION

1. Field of the Invention

The invention relates to a method for automatically loading a feed line with bulk material, in particular a plastic granular material, in a suction delivery system having at least one material separator, which is provided at a distance to a reservoir. Furthermore, the invention relates to a device for implementation of said method.

2. Background Description

Pneumatic delivery systems are operated generally in such a way that the setting of the material to air mixture is fixed at the material feeding point. Among experts, this is the load of the feed line. Basically, different designs of material feeding points are known, whereby the problem arises for all of them that an optimal mixture cannot be achieved for varying delivery lengths as a result of the fixed setting.

Pneumatic delivery systems for bulk material are planned and designed in such a way that flexibility is achieved for material distribution. Different delivery targets are served in sequence from a single material source, such as, for example, the reservoir. Based on the set values fixed at the material feeding point, a load results for the delivery in accordance with the fan characteristic and the length up to the material separator. For practical reasons, this is set in such a way that delivery is ensured for common material types and the longest delivery distance. However, the load is smaller if shorter delivery distances are served. Reduced load increases the wear of the feed lines and the receiving devices, for example the material separators, at the delivery target due to higher bulk speeds.

By reducing the load, the flow of the bulk material is reduced at the same time, although the bulk material is transported faster through the pipeline. Wearing of the material itself is also given, which creates deposits in the feed line or becomes effective as dust.

An apparatus for conveying bulk material, in which a variable amount of a conveying gas may be introduced to the bulk material to be conveyed by a vacuum conveying system, is thus known from DE 100 39 564 A1. However, practical tests have shown that the control of the conveying gas alone does not result in a prevention of the disadvantages mentioned above.

SUMMARY OF THE INVENTION

The aim of the invention is to create a method of the type mentioned above, which on the one hand avoids the above-mentioned disadvantages, and on the other hand guarantees economic operation of a suction delivery system.

Said aim is fulfilled by the invention.

The method in accordance with the invention is characterized in that:

for the area of the loading point, at least one target value for the air speed is empirically determined from feed line parameters related to the feed line and from material parameters related to the bulk material and said value is stored in a database where applicable, that in the area of the loading point, the air speed or a quantity serving for determination of the air speed is measured in the feed line, that the target value and the measured value of the air speed are fed to a controller, and that when the target value is reached, bulk material is added in a metered manner, wherein the bulk material is added in a metered manner according to the measured value of the air speed, for example continuously or in cycles. With this invention, it is for the first time possible to guarantee a load that is adapted accordingly to the delivery distance, by which the total delivery output of the system is increased significantly. Moreover, wearing of pipelines, equipment and bulk material is reduced dramatically in an advantageous manner as a result of the optimal load.

The method for automatic loading according to the invention ensures that the optimal load is given for different delivery distances or lengths and different material types.

Both the feed line parameters as well as the material parameters can be determined from technical publications in connection with practical test experiences. A target value for the air speed can be calculated from these two parameters, which are described in more detail later. Naturally, this target value can be stored in a database and used automatically for the control.

The air speed is measured in the area of loading. Naturally, it would also be possible to record measured values from which the air speed can be calculated. Thus, it is absolutely conceivable that the pressure loss at an obstacle in the feed line is recorded and used for determination of the air speed. This obstacle could also be the pipe socket, for example. In the same way, for example, the detection of the air quantity in connection with the pipe cross-section could serve for determination of the air speed. Primarily, just one value, namely the lower limit value, is relevant for the control.

The target value and the measured value of the air speed, as actual value, are then compared. When the actual value reaches the target value, bulk material is added in a metered manner. The air speed is measured at regular intervals during operation of the delivery system and the addition of bulk material in a metered manner is adjusted accordingly.

In accordance with a special feature of the invention, a minimum target value and a maximum target value are determined empirically. This way, it is possible to operate the delivery system with a bandwidth in practical use. The minimum target value is preferably the lower limit value and the maximum target value the upper one. The aforementioned advantages are achieved within a bandwidth of this type.

In accordance with another special feature of the invention, the air speed is controlled to the target value via the suction capacity. Using a control of this type superimposed on the control explained above, hypersensitive settings are possible in operation.

In accordance with a special embodiment of the invention, the air speed is measured in the feed line ahead (i.e., upstream) of the loading point. Based on tests and basic physical considerations, the air speed at the material feeding point or loading point for pneumatic suction delivery is decisive for its optimization. Performance of the measurement ahead of the loading point provides the advantage that the air to be measured has no material or dust load.

In accordance with a further embodiment of the invention, the switching cycles of the metered addition of material are damped through an electronic time-lag device or a reducing damper. As mentioned already, material or bulk material is added to the feed line in a metered manner when the target value of the air speed is reached. At the moment of the addition in a metered manner, however, the air speed drops at the measuring point and the addition of material could be stopped. To stabilize the control of the load, damping of the switching cycles has thus proved to be very advantageous.

In accordance with a feature of the invention, the feed line parameters are determined from the air density and the cross-section of the feed line and/or the roughness of the inner pipe surface. As mentioned already, these quantities are important for determination of the target value of the air speed.

In accordance with another feature of the invention, the material parameters are determined from the specific gravity and/or the grain closeness and/or the grain diameter and/or the grain form of the bulk material. These factors also play a major role for determination of the target value for the air speed.

It is also an aim of the invention to create a device for implementation of the method shown above, which has both a simple design and enables an economic operation.

The device in accordance with the invention for a delivery system comprising a reservoir for the bulk material with a loading device and a feed line to the material separator is characterised in that an orifice having a pressure switch for measuring the air speed is provided in the area of the loading device, and the loading device is designed as a metering apparatus. With this device in accordance with the invention, it is for the first time possible to achieve an automatic, in particular optimal, loading for different delivery distances or lengths and different material types in delivery systems for bulk material. The simple conceptual design in connection with common machine parts guarantees an economic equipment of the delivery system. Especially the machine elements require low maintenance, which in no way diminishes the economic efficiency of the system in use. Another advantage of said device in accordance with the invention must be seen in the fact that an existing delivery system can be retrofitted at any time. The installation of the device in accordance with the invention is also easily given without any overproportional expense.

In accordance with a special embodiment of the invention, the orifice is arranged ahead of the metering apparatus. As mentioned already, it is possible to measure the air flow without any load by material or dust based on this arrangement.

In accordance with a further embodiment of the invention, a one-way restrictor is switched in series to the pressure switch to dampen the number of switching actuations of the metering apparatus. To stabilize the control of the metering process temporarily, damping of the switching cycles has proved to be very advantageous. These machine elements also require low maintenance and guarantee a long operating cycle.

In accordance with a special embodiment of the invention, the metering apparatus includes a metering aperture which can be actuated through a pneumatic cylinder. These machine elements also have a robust structure, so that no separate idle times due to service works occur.

In accordance with another embodiment of the invention, the pneumatic cylinder is driven through a magnetic valve and a compressed air source. The abovementioned advantages in relation to the machine parts in accordance with the invention apply here as well.

In accordance with another special embodiment of the invention, the drive signal for driving can be generated from a supply point and the pressure switch. The advantages of the operational safety are obvious based on the simplicity of the structure and the functionality.

In accordance with an embodiment of the invention, a vacuum sensor is provided ahead of the pump for measuring the suction capacity. Sensors of this type are manufactured according to modern requirements and can hardly be overbid economically in the acquisition costs.

In embodiments, the present invention is directed to a method for automatically loading a feed line with bulk material in a suction delivery system having the feed line, a loading point, a reservoir, and at least one material separator arranged at a distance to the reservoir. The method comprises selecting a target value for an air speed for an area of the loading point, wherein for the area of the loading point, a minimum target value and a maximum target value for the air speed are empirically determined from feed line parameters related to the feed line and from material parameters related to the bulk material, and the minimum target value and the maximum target value are stored in a database, and measuring in the area of the loading point one of the air speed and a quantity serving for determination of the air speed in the feed line. The method further includes sending the target value and the measured value of the air speed to a controller, controlling the air speed to the target value via a suction capacity using the controller, and adding the bulk material in a metered manner in dependence upon the measured value of the air speed when the target value is reached.

In embodiments, the bulk material comprises a plastic granular material.

In additional embodiments, the adding the bulk material comprises adding the bulk material one of continuously or in cycles.

In further embodiments, the air speed is measured upstream of the loading point in the feed line relative to a feed flow direction in the feed line.

In embodiments, the adding the bulk material comprises adding the bulk material in cycles, the method further comprising damping a switching of cycles using one of an electronic time-lag device or a reducing damper.

In additional embodiments, the feed line parameters are determined from at least one of an air density and a cross-section of the feed line, and a roughness of an inner pipe surface.

In further embodiments, the material parameters are determined from at least one of a specific gravity, a grain closeness, a grain diameter, and a grain form of the bulk material.

Embodiments of the present invention are also directed to a device for the delivery system for implementation of the claimed method. The delivery system comprises the reservoir structured and arranged for containing the bulk material, the loading device structured and arranged as a metering apparatus comprising a metering aperture actuatable through a pneumatic cylinder, and the feed line to a material separator. The device comprises an orifice having a pressure switch structured and arranged for measuring an air speed provided in an area of the loading device.

In additional embodiments, the orifice is arranged upstream of the metering apparatus relative to a feed flow direction in the feed line.

In further embodiments, the device further comprises a one-way restrictor switched in series to the pressure switch, which is structured and arranged to dampen a number of switching actuations of the metering apparatus.

In embodiments, the device further comprises a magnetic valve and a compressed air source, wherein the pneumatic cylinder is driven through the magnetic valve and the compressed air source.

In additional embodiments, a drive signal for driving the pneumatic cylinder is generatable from a supply point and the pressure switch.

In further embodiments, the device further comprises a vacuum sensor arranged upstream of the pump for measuring the suction capacity.

BRIEF DESCRIPTION OF THE DRAWING

The invention is explained in more detail on the basis of the embodiment illustrated in the FIGURE.

The FIGURE shows a schematic diagram of a device for automatically loading a delivery system for bulk material.

DETAILED DESCRIPTION OF THE INVENTION

In accordance with the FIGURE, a delivery system comprises a reservoir 1 for bulk material 2, whereby a suction delivery system for plastic granulate is shown in the presented case. Naturally, the reservoir 1 can also be designed as storage or dry container. The reservoir 1 flows into a feed line 4 at its bottom end through a loading device 3. The feed line 4 is connected at one end (indicated by arrow 5) with at least one material separator 15, and in an industrial delivery system with multiple material separators (not shown). After the material separator 15, the feed line 4 is connected to a suction pump (also not shown). Naturally, the suction capacity of the suction pump influences the air speed in the feed line 4, in addition to feed line-specific parameters and material-specific parameters, as still described in more detail below.

To thus achieve an optimal load to the material separators arranged at varying distances using a suction delivery system for bulk material 2 of this type, a target value for the air speed is empirically determined for the area of the loading point from feed line parameters related to the feed line and from material parameters related to the bulk material and said value is stored in a database 16 where applicable. Furthermore, the air speed is measured in the feed line 4 in the area of the loading point. An orifice 6 serves for measuring the air speed. Said orifice 6 is preferably provided ahead (i.e., upstream) of the loading device 3. As generally known, the air flow sucked in creates a pressure loss at the orifice 6, which is measured.

Naturally, other quantities serving for determination of the air speed could also be measured. Thus, the pressure loss at an obstacle in the feed line 4 could be recorded and used for determining the air speed. This obstacle could also be the pipe socket, for example. In the same way, for example, the detection of the air quantity in connection with the pipe cross-section could serve for determination of the air speed.

The feed line parameters are determined from the air density and the cross-section of the feed line 4 and/or the roughness of the inner pipe surface. The material parameters are determined from the specific gravity and/or the grain closeness and/or the grain diameter and/or the grain form of the plastic granulate.

The target value and the measured value of the air speed are fed to a controller. When the target value is reached, bulk material 2 is added in a metered manner, wherein the bulk material 2 is added in a metered manner according to the measured value of the air speed, for example continuously or in cycles.

In the area of the loading device 3, the orifice 6 is provided with a pressure switch 7 for measuring the air speed. The loading device 3 is designed as a metering apparatus. The pressure switch 7 measures the abovementioned pressure loss and is practically the controller, as mentioned above, wherein the target value for the air speed is entered at this pressure switch 7.

When the target value of the air speed is reached, the pressure switch 7 closes and bulk material 2 is added in a metered manner. The bulk material 2 is added in a metered manner according to the measured value of the air speed, for example continuously or in cycles.

Hence, the load of the feed line 4 is controlled irrespective of the length of the feed line 4 via the metered addition of material depending on the air speed at the loading point. The load for delivery is adjustable by setting the switching point at the pressure switch 7 and a one-way restrictor 13 still described in more detail below.

The metering apparatus includes a metering aperture 8 which can be actuated through a pneumatic cylinder 9. The pneumatic cylinder 9 is driven through a magnetic valve 11 and a compressed air source 10. The drive signal for driving can be generated from a supply point 12 and the pressure switch 7.

To dampen the number of switching actuations of the metering apparatus and/or to stabilize the control of the metering process temporarily, a one-way restrictor 13 is switched in series to the pressure switch 7. Naturally, the switching cycles of the metered addition of material could also be damped through an electronic time-lag device or a reducing damper in an alternative solution.

In order to be able to operate the delivery system with a bandwidth in practical use, a minimum target value and a maximum target value are determined. The minimum target value is preferably the lower limit value and the maximum target value the upper one. The aforementioned advantages are achieved within a bandwidth of this type.

In addition to the control of the metered addition, it is certainly advantageous if the air speed is also controlled to a target value via the suction capacity. A vacuum sensor is provided ahead (i.e., upstream) of the pump for measuring the suction capacity.

The invention claimed is:

1. Method for automatically loading a feed line with bulk material in a suction delivery system having the feed line, a loading location, a reservoir, and at least one material separator arranged at a distance to the reservoir, the method comprising:

selecting a target value for an air speed for an area of the loading location, wherein for the area of the loading location, a minimum target value and a maximum target value for the air speed are empirically determined from feed line parameters related to the feed line and from material parameters related to the bulk material, and the minimum target value and the maximum target value are stored in a database;

measuring in the area of the loading location one of the air speed and a quantity serving for determination of the air speed in the feed line;

sending the target value and the measured value of the air speed to a controller;

controlling the air speed to the target value via a suction capacity using the controller; and opening an actuatable metering aperture to add the bulk material in a metered manner in dependence upon the measured value of the air speed when the target value is reached.

2. The method of claim 1, wherein the bulk material comprises a plastic granular material.

3. The method of claim 1, wherein the adding the bulk material comprises adding the bulk material one of continuously or in cycles.

4. The method of claim 1, wherein the air speed is measured upstream of the loading location in the feed line relative to a feed flow direction in the feed line.

5. The method of claim 1, wherein the adding the bulk material comprises adding the bulk material in cycles, the method further comprising damping a switching of cycles using one of an electronic time-lag device or a reducing damper.

6. The method of claim 1, wherein the feed line parameters are determined from at least one of an air density and a cross-section of the feed line, and a roughness of an inner pipe surface.

7. The method of claim 1, wherein the material parameters are determined from at least one of a specific gravity, a grain closeness, a grain diameter, and a grain form of the bulk material.

* * * * *